United States Patent
Yamane et al.

(10) Patent No.: US 6,248,456 B1
(45) Date of Patent: Jun. 19, 2001

(54) SURFACE-TREATED STEEL PLATE HAVING LOW CONTACT RESISTANCE AND CONNECTION TERMINAL MEMBER MADE OF THE STEEL PLATE

(75) Inventors: Keiji Yamane; Hitoshi Ohmura; Tatsuo Tomomori; Hideo Ohmura, all of Yamaguchi (JP)

(73) Assignee: Toyo Kohan Co., Ltd., Tokyo (JP)

( * ) Notice: Subject to any disclaimer, the term of this patent is extended or adjusted under 35 U.S.C. 154(b) by 0 days.

(21) Appl. No.: 09/254,940

(22) PCT Filed: Sep. 17, 1997

(86) PCT No.: PCT/JP97/03275
§ 371 Date: Mar. 17, 1999
§ 102(e) Date: Mar. 17, 1999

(87) PCT Pub. No.: WO98/12002
PCT Pub. Date: Mar. 26, 1998

(30) Foreign Application Priority Data

Sep. 17, 1996 (JP) .................................................. 8-265098

(51) Int. Cl.$^7$ .................................................. B32B 15/08
(52) U.S. Cl. .................................................. 428/626; 428/634
(58) Field of Search .................................. 428/626, 624, 428/634

(56) References Cited

U.S. PATENT DOCUMENTS

| | | | |
|---|---|---|---|
| 4,719,038 | * | 1/1988 | Sobata et al. .................... 252/511 |
| 4,891,273 | * | 1/1990 | Odashima et al. ................. 428/623 |
| 4,985,311 | * | 1/1991 | Shindou et al. .................. 428/623 |
| 5,190,830 | * | 3/1993 | Matsuo et al. ................... 428/626 |
| 5,387,473 | * | 2/1995 | Yoshimi et al. .................. 428/623 |
| 5,589,279 | * | 12/1996 | Yoshimi et al. ................. 428/623 |
| 5,609,968 | * | 3/1997 | Yoshimi et al. .................. 428/623 |

* cited by examiner

Primary Examiner—Francis J. Lorin
(74) Attorney, Agent, or Firm—Browdy & Neimark

(57) ABSTRACT

The object of the present invention is to provide a surface-treated steel sheet, the surface of which is provided with a coating film formed by using after-treatment solution containing carbon black or graphite, carboxy methylcelluolse, and an aqueous organic resin composed of acrylic resin, polyester resin, urethane resin or phenolic resin, thus having a low contact resistance, excellent corrosion-resistance and excellent adhesion of the coating film and to provide a connection terminal member using the above mentioned surface-treated steel sheet.

In order to achieve the object, the surface-treated steel sheet of the present invention has a surface provided with a coating film containing carbon black or graphite, carboxy methylcellulose, an aqueous organic resin such as acrylic resin, polyester resin, urethane resin or phenolic resin, and a cross linking agent of the aqueous organic resin, the coating film being formed on a steel sheet which is plated with Zn, Ni, Sn, Co or any alloy of them.

10 Claims, No Drawings

SURFACE-TREATED STEEL PLATE HAVING LOW CONTACT RESISTANCE AND CONNECTION TERMINAL MEMBER MADE OF THE STEEL PLATE

FIELD OF THE INVENTION

The present invention relates to a surface-treated steel sheet having a low contact resistance excellent in conductivity, unchanged or stable conductivity even after aging, corrosion resistance, and adhesion, and it also relates to a connection terminal member using said steel sheet.

BACKGROUND OF THE INVENTION

Conventionally, a carbon—carbon combination has been used as a chief material for electric connection terminal members from the viewpoint of conductivity and corrosion resistance. The carbon—carbon combination is, however, expensive and involves a problem in formability, so it has been investigated to provide a combination of carbon and metal sheet. But, the carbon-metal sheet combination has a problem that an oxide or hydroxide is formed on the surface of a metal sheet combined with carbon and therefore the carbon-metal sheet combination has its conductivity remarkably decreased as i4 ages.

In order to solve the problem mentioned above, there has been an increasing demand for a material for making an electric connection terminal cheaper than carbon and as well conductive as carbon.

An electric connection terminal member made of metal-only material is cheap but poor in corrosion resistance because oxide or hydroxide is formed on the surface of such metal-made member as time passes, resulting in deterioration of conductivity. Therefore, the metal-only material is inadequate to use for the connection terminal member.

In order to solve the problem as mentioned above, it is a technical object to provide a surface-treated steel sheet having a low contact resistance excellent in conductivity, unchanged or stable conductivity even after aging, corrosion resistance, and adhesion, and also to provide a connection terminal member using this steel sheet.

DISCLOSURE OF THE INVENTION

A surface-treated metal sheet of the present invention is characterized in that a coating film which contains carbon black or graphite, carboxy methylcellulose, and an aqueous organic resin is formed on a steel sheet and the steel sheet thus coated with the said coating film has a low contact resistance.

A surface-treated metal sheet of the present invention is also characterized in that a coating film which contains carbon black or graphite, carboxy methylcellulose, an aqueous organic resin, and a cross-linking agent of the aqueous organic resin is formed on a steel sheet and the steel sheet thus coated with the said coating film has a low contact resistance.

In such surface-treated steel sheets, the aqueous organic resin may preferably be acrylic resin, polyester resin, urethane resin of phenolic resin.

The steel sheet may preferably be plated with Zn, Ni, Sn, Co or any alloy of said metals. Further, the steel sheet may preferably be provided with a multilayer plating composed of a lower layer of Ni-plating and an upper layer of Zn-, Sn- or Co-plating and also the thus plated steel sheet may preferably be subjected to diffusion treatment.

Furthermore, the connection terminal member according to claim 7 is characterized in that a contacting portion of the electric connection terminal member with carbon is made of the surface-treated steel sheet according to the present invention.

BEST MODE FOR CARRYING OUT THE INVENTION

A steel sheet is provided with a mono layer plating such as Zn, Ni, Sn or Co, or an alloy plating with any alloy of said metals or a multilayer plating with any of said metals. Or, another steel sheet may be primarily plated Keith any type of plating among those mentioned above and then diffusion-treated. A coating film is formed on the thus treated steel sheet by using a water soluble after-treatment solution containing carbon or graphite, carboxy methylcellulose, and an aqueous organic resin composed of acrylic resin, polyester resin, urethane resin or phenolic resin. The thus formed coating film serves to isolate the surface of the plated steel sheet from oxygen in the atmosphere which would induce oxidation of the steel sheet. Therefore, the coating film prohibits the formation of an oxide film which would cause decrease in conductivity of the steel sheet, thus enabling to inhibit the deterioration of conductivity and the corrosion resistance of the steel sheet. Further, even though covered with a coating film, the steel sheet is almost free from deterioration of conductivity because the coating film contains carbon black or graphite excellent in conductivity.

The present invention is explained more in detail below with reference to preferred embodiments.

As the plated steel sheet, a cold rolled steel sheet which is provided with a mono layer plating of Zn, Ni, Sn or Co, or an alloy plating or a multilayer plating with any of said metals, or provided with any plating of said metals and thereafter diffusion-treated may be used. In the case of multilayer plating, it is preferred that the first plating is performed using Ni, Sn or Co in view of homogenization of the following plating. Particularly, a Sn—Ni alloy is excellent in acid resistance, so it is preferred that a steel sheet plated with Sn—Ni alloy composition is applied to a connection terminal for use in things liable to induce an acidic atmosphere such as lead storage battery or fuel cell. Suitable amount of the plating may be in the range of 2 to 50 $g/m^2$. In the case of plating less than 2 $g/m^2$, the resultant plated steel sheet is poor in corrosion resistance. More than 50 $g/m^2$ of plating leads to a increase in costs. The diffusion treatment may preferably be carried out in an atmosphere of oxygen-free nitrogen gas, hydrogen gas, mixed gas of nitrogen and hydrogen, or argon gas at a heating temperature ranging from 232° C. to 600° C. Heating time for the diffusion treatment may preferably be not so long as to diffuse Fe into the surface of the plated steel sheet in view of corrosion resistance.

The steel sheet that has been plated or first plated and then diffusion-treated is treated by using an aqueous water solution containing 10 to 3500 g/l of carbon black or graphite, 0.1 to 40 g/l of carboxy methylcellulose, and 1 to 200 g/l of aqueous organic resin as solid which composed of acrylic resin, polyester resin, urethane resin or phenolic resin.

The carbon black may be channel type black, furnace black, acetylene black or kettchen black. The graphite may be artificial graphite, vein graphite, flake graphite or amorphous graphite. In the case of graphite content less than 10 g/l by concentration, the resultant product is poor in conductivity. On the other hand, in the case of graphite concentration exceeding 350 g/l, dispersibility of such graphite becomes remarkably poor.

The aqueous organic resin may be a water-soluble type resin, water-dispersible type resin or emulsion type resin.

The aqueous acrylic resin includes a polymer and copolymer such as acrylic acid and ester thereof, acrylamide, acrylonitrile, and methacrylic acid and ester thereof. Functional groups for the esters may be carboxyl group, amino group, methyl group, ethyl group, butyl group, amyl group, ethylhexyl group or octyl group. Aqueous ethylene-acrylic resin may also be included in the above mentioned functional groups.

The aqueous polyester resin may include polyoxyethylene nonylphenol-ether, polyoxyethylene nonylphenol-ether sodium sulfate, lauryl sodium sulfate, and water-solubilized rosin soap. It also may include resins having a hydrophilic group such as carboxyl group, sulfone group, sulfate group, phosphate group, amino group, ammonia salt, hydroxide group, ether group or amide group, that is, alkyd resin, maleic acid resin, and unsaturated polyester.

The aqueous urethane resin includes resins having end groups of water-soluble COOH or amine.

The aqueous phenolic resin includes a resol type resin which is obtained by reacting phenol with formaldehyde in the presence of alkali catalyst.

If the aqueous organic resin concentration which composed of acrylic resin, polyester resin, urethane resin or phenolic resin is less than 1 g/l by concentration as solid contents, resultant product is poor in the corrosion resistance. If the resin concentration exeeds 200 g/l, the resultant product is remarkably poor in conductivity and besides, the viscosity of the treatment solution becomes much higher, thus making it difficult to provide uniform treatment. The concentration of the above mentioned cross-linking agent of the aqueous organic resin may be added in the range of 0.1 to 20% with regard to the aqueous organic resin as solid contents. Table 1 shows types of cross linking agents usable for the above mentioned aqueous organic resin.

If the concentration of the cross linking agent is lower than 0.1% with regard to that of the aqueous organic resin, it has no effect on adhesion. On the other hand, in the case of concentration thereof exceeding 20%, the aqueous resin is so rapidly crosslinked that precipitates form and such treatment solution is not stable upon aging.

The carboxyl methylcellulose may contain sodium, potassium or ammonium. If the carboxyl methylcellulose content is less than 0.1 g/l, it is poor in film-forming ability or adhesion. On the other hand, in the case of concentration thereof exceeding 40 g/l, dispersibility thereof becomes remarkably poor.

Coating methods for the treatment solution are not specifically limited and may be spray coating, roller coating, knife coating, curtain flow coating, dipping and roller coating or air knife coating.

The suitable dry film thickness of a coating film is in the range of 0.02 to 10 $\mu$m. In the case of coating film having a thickness less than 0.02 $\mu$m, it cannot uniformly cover the surface of plating. Therefore, it is pool in the corrosion resistance and conductivity after aging. In the case of coating film having a thickness more than 10 $\mu$m, corrosion resistance will be improved, but conductivity comes to saturation, which is uneconomical.

EXAMPLES

A cold rolled steel sheet, of 0.25 mm thick was degreased, pickled, and rinsed. Directly thereafter it was electroplated on both sides with Ni using Watt bath so as to have a coating weight of 31 g/m$^2$. It was rinsed and then plated with 5 g/m$^2$ of Sn using sulfuric acid bath. The thus plated steel sheet was subjected to diffusion treatment in an atmosphere comprising 95 volume % of $N_2$ gas and 5 volume % of $H_2$ gas at a temperature of 500° C. for a time of 5 hours to prepare a surface treated steel sheet. In the next step, the surface treated steel sheet was immersed in an after-treatment solution containing 320 g/l of artificial graphite and 2 g/l of sodium carboxy methylcellulose and then was applied by roller coating to have a dry film thickness of 4 $\mu$m and dried at a temperature of 70° C. to prepare a test piece for evaluation.

Similarly, some other test pieces were prepared using various types of after-treatment solutions respectively having different compositions (Examples 1 to 30). Tables 2 to 6 show plating types, the amounts of plating, kind of solution used in the after-treatment, and dry film thickness of the coatings thus formed. Among them, Table 2 shows a case of using acrylic resin as one type of aqueous organic resin contained in the after-treatment solution, Table 3 shows a case of using ethylene acrylic resin, Table 4 shows a case of using polyester resin, Table 5 shows a case of urethane resin, and Table 6 shows a case of using phenolic resin, respectively, in the same way.

Comparative Example 1

A cold rolled steel sheet was plated in the same manner as in Example 1 but not subjected to any after-treatment to prepare a test piece of Comparative example 1.

Comparative Example 2

A cold rolled steel sheet, was plated in the same manner as in Example 2 but not subjected to any after-treatment to prepare a test piece of Comparative example 2.

The test pieces obtained from Examples and Comparative examples were evaluated with regard to their properties by the methods described below. The evaluation results thereof are shown in Tables 7 and 8.

Methods for Evaluation of Properties

The evaluation of the properties shown in Tables 7 and 8 was performed as follows.

1. Corrosion Resistance

The test pieces were held upright in a thermo-hygrostat of 75° C. and 90% RH for a duration of 700 hours. They were evaluated according to the occurrence of red rust on their surfaces by employing the rating number method (JIS Z 2371). In general, a greater rating number indicates a more excellent corrosion resistance.

2. Contact Resistance

A carbon sheet of 0.5 cm thickness, 1.5 cm width and 1.5 cm length was put between pair of test, pieces of 1.5 cm width and cm length under a pressure of kg/cm$^2$. A contact resistance between the pair of test pieces was measured by TESTER (HIOKI 3225 manufactured by HIOKI Co., Ltd.) and conductivity of the test pieces was evaluated according to the contact resistance per unit contacting area. The contacting area of the carbon sheet with the test piece was 2.25 cm$^2$. The contact, resistance was measured at an initial time and at a time after the test piece had been held in the atmosphere of 75° C. and 90% RH for 840 hours. A case where the determined contact resistance is not higher than 100 m $\Omega$/cm$^2$ is given a mark of ○ and a case where the determined contact resistance exceeds 100 $\Omega$/cm$^2$ is given a mark of X.

3. Adhesion of Coating Film Formed of After-Treatment Solution

Adhesion of a coating film formed by using an after-treatment solution in a state of plane sheet was evaluated by the method for cross-cut adhesion test using a tape (method for forced peel-off test using a cellophane tape: JIS K 5400). A case where no peel-off occurred is given a mark of ⊚, a case where peel-off of an uppermost layer occurred is given a mark of ○, and a case where peel-off occurred at the interface between a plating layer and a coating film is given a mark of x.

POSSIBLE USE IN THE FIELD

Clearly from Tables 7 and 8, the surface treated steel sheet of the present invention is excellent in corrosion resistance, conductivity, unchanged conductivity even after aging, and adhesion of the coating film formed by using the after-treatment solution.

TABLE 1

Type of crosslinking agent usable for the Invention

| Type of aqueous organic resin | Type of crosslinking agent |
|---|---|
| Acrylic resin | (1) Compound including hydrazine group<br>(2) Compound including epoxy group<br>(3) Siloxane<br>(4) Compound including amino group<br>(5) Epoxy resin |
| Polyester resin | (1) Compound of butylated melamine resin denatured by dimethylol propionic acid<br>(2) Aqueous block isocyanate compound which is made a block by methylolphenol or methylethyl-ketoxyme<br>(3) Compound including epoxy group and amine group<br>(4) Compound including aziridine and carboxyl group<br>(5) Hydrazine and diacetone acrylamide<br>(6) Compound including polyatomic metal formed with chelating agent such as zinc acetate or aluminum acetate |
| Urethane resin | (1) methylide metamine resin<br>(2) Epoxy resin<br>(3) Metal crosslinking agent such as zinc complex<br>(4) Aziridine compound<br>(5) Isocyanate compound<br>(6) Primary and secondary di- and poly-amines<br>(7) Amino resin including primary and secondary di- and poly-amines |
| Phenolic resin | (1) Epoxy resin |

TABLE 2

Case of using after-treatment solution containing aqueous acrylic resin

| | Plated steel sheet | | | After-treatment | | |
|---|---|---|---|---|---|---|
| Example | Type of plating | Amounts of plating (g/m2) | Diffusion treatment | Type of solution used (g/l) (as solid) | | Dry film thickness (μm) |
| Example 1 | upper layer: Sn<br>lower layer: Ni | 5<br>31 | soaking<br>at 500° C. for 5 hours | artificial graphite<br>acrylic resin (water dissolution type)<br>carboxy methylcellulose | 320<br>5<br>2 | 4 |
| Example 2 | Ni | 36 | soaking<br>at 500° C. for 5 hours | vein graphite<br>acrylic resin (water dispersion type)<br>carboxy methylcellulose | 50<br>9<br>0.1 | 0.2 |
| Example 3 | Ni | 50 | — | vein graphite<br>acrylic resin (emulution type)<br>carboxy methylcellulose | 200<br>100<br>0.5 | 1 |
| Example 4 | upper layer: Sn<br>lower layer: Ni | 3<br>31 | soaking<br>at 232° C. for 5 hours | amorphous graphite<br>acrylic resin (water dissolution type)<br>carboxy methylcellulose | 80<br>30<br>2 | 2 |
| Example 5 | Zn-3% Co | 2 | — | kettchen black<br>acrylic resin (water dispersion type)<br>carboxy methylcellulose | 120<br>200<br>10 | 0.07 |
| Example 6 | Zn | 10 | — | channel black<br>acrylic resin (water dispersion type)<br>carboxy methylcellulose | 180<br>50<br>2 | 0.02 |
| Example 7 | Zn-11% Ni | 5 | — | acetylene black<br>acrylic resin (emulsion type)<br>epoxy resin<br>carboxy methylcellulose | 350<br>0.2<br>40 | 10 |
| Example 8 | upper layer: Co<br>lower layer: Ni | 3<br>31 | soaking<br>at 600° C. for 1 hour | furnace black<br>acrylic resin(emulsion type)<br>carboxy methylcellulose | 150<br>70<br>2 | 0.7 |

TABLE 3

Case of using after-treatment solution containing aqueous ethylene acrylic resin

| Example | Plated steel sheet Type of plating | Amounts of plating (g/m2) | Diffusion treatment | After-treatment Type of solution used (g/l) (as solid) | | Dry film thickness (μm) |
|---|---|---|---|---|---|---|
| Example 9 | upper layer: Sn<br>lower layer: Ni | 5<br>31 | soaking<br>at 500° C. for 6 hours | vein graphite<br>ethyleneacrylic resin<br>(water dispersion type)<br>carboxy methylcellulose | 150<br>5<br><br>0.1 | 0.02 |
| Example 10 | Ni | 36 | soaking<br>at 500° C. for 5 hours | vein graphite<br>ethyleneacrylic resin<br>(water dissolution type)<br>carboxy methylcellulose | 100<br>10<br><br>2 | 0.2 |
| Example 11 | Ni | 50 | — | amorphous graphite<br>ethyleneacrylic resin (emulsion type)<br>isocyanate compound<br>carboxy methylcellulose | 50<br>100<br>10<br>0.5 | 1 |
| Example 12 | upper layer: Sn<br>lower layer: Ni | 3<br>31 | soaking<br>at 400° C. for 5 hours | kettchen black<br>ethylenacrylic resin<br>(water dissolution type)<br>carboxy methylcellulose | 200<br>200<br><br>2 | 2 |
| Example 13 | Zn-3% Co | 5 | — | channel black<br>ethyleneacrylic resin<br>(water dissolution type)<br>carboxy methylcellulose | 80<br>70<br><br>10 | 0.07 |
| Example 14 | Zn | 10 | — | acetyiene black<br>ethylenacrylic resin (emulsion type)<br>carboxy methylcellulose | 100<br>50<br>20 | 5 |
| Example 15 | Ni-50% Sn | 5 | — | furnace black<br>ethyleneacrylic resin<br>(water dissolution type)<br>carboxy methylcellulose | 50<br>1<br><br>40 | 10 |
| Example 16 | upper layer: Co<br>lower layer: Ni | 3<br>31 | — | artificial graphite<br>ethylenacrylic resin (emulsion type)<br>carboxy methylcellulose | 50<br>150<br>2 | 0.7 |

TABLE 4

Case of using after-treatment solution containing aqueous polyester resin

| Example | Plated steel sheet Type of plating | Amounts of plating (g/m2) | Diffusion treatment | After-treatment Type of solution used (g/l) (as solid) | | Dry film thickness (μm) |
|---|---|---|---|---|---|---|
| Example 17 | upper layer: Sn<br>lower layer: Ni | 5<br>31 | soaking<br>at 500° C. for 5 hours | vein graphite<br>polyester resin (emulsion type)<br>carboxy methylcellulose | 50<br>3<br>0.1 | 0.02 |
| Example 18 | Ni | 36 | soaking<br>at 500° C. for 5 hours | amorphous graphite<br>polyester resin (water dissolution type)<br>aqueous block isocyanate compound<br>carboxy methylcellulose | 120<br>10<br>1<br>2 | 0.2 |
| Example 19 | Ni-5% Co | 50 | — | kettchen black<br>polyester resin (emulsion type)<br>carboxy methylcellulose | 200<br>200<br>0.5 | 1 |
| Example 20 | upper layer: Sn<br>lower layer: Ni | 3<br>31 | soaking<br>at 400° C. for 5 hours | channel black<br>polyester resin (water dissolution type)<br>carboxy methylcellulose | 150<br>50<br>2 | 2 |
| Example 21 | Zn-3% Co | 2 | — | acetylene black<br>polyester resin (water dispersion type)<br>polyamine compound<br>carboxy methylcellulose | 80<br>16<br>0.2<br>10 | 0.07 |
| Example 22 | Sn | 6 | soaking<br>at 300° C. for<br>3 seconds | furnace black<br>polyester resin (emulsion type)<br>carboxy methylcellulose | 50<br>22<br>20 | 5 |

TABLE 4-continued

Case of using after-treatment solution containing aqueous polyester resin

| Example | Plated steel sheet Type of plating | Amounts of plating (g/m2) | Diffusion treatment | After-treatment Type of solution used (g/l) (as solid) | | Dry film thickness (μm) |
|---|---|---|---|---|---|---|
| Example 23 | Zn-11% Ni | 5 | — | artificial graphite<br>polyester resin (water dissolution type)<br>carboxy methylcellulose | 170<br>1<br>40 | 10 |
| Example 24 | upper layer: Zn<br>lower layer: Ni | 3<br>31 | — | vein graphite<br>polyester resin (water dispersion type)<br>carboxy methylcellulose | 170<br>27<br>2 | 0.7 |

TABLE 5

Case of using after-treatment solution containing aqueous urethane resin

| Example | Plated steel sheet Type of plating | Amounts of plating (g/m2) | Diffusion treatment | After-treatment Type of solution used (g/l) (as solid) | | Dry film thickness (μm) |
|---|---|---|---|---|---|---|
| Example 25 | upper layer: Sn<br>lower layer: Ni | 5<br>31 | soaking<br>at 500° C. for 5 hours | artificial graphite<br>urethane resin (water dispersion type)<br>carboxy methylcellulose | 350<br>30<br>10 | 0.02 |
| Example 26 | Ni | 36 | soaking<br>at 300° C. for 5 hours | vein graphite<br>urethane resin (water dissolution type)<br>carboxy methylcellulose | 10<br>1<br>0.5 | 0.2 |
| Example 27 | Ni | 50 | soaking<br>at 600° C. for 5 hours | vein graphite<br>urethane resin (emulsion type)<br>carboxy methylcellulose | 120<br>12<br>2 | 1 |
| Example 28 | upper layer: Sn<br>lower layer: Ni | 3<br>31 | — | amorphous graphite<br>urethane resin (emulsion type)<br>carboxy methylcellulose | 200<br>5<br>2 | 2 |
| Example 29 | Co-3% Sn | 2 | — | acetylene black<br>urethane resin (water dispersion type)<br>carboxy methylcellulose | 180<br>18<br>0.1 | 0.07 |
| Example 30 | Co | 10 | — | furnace black<br>urethane resin (emulsion type)<br>carboxy methylcellulose | 50<br>200<br>40 | 10 |
| Example 31 | upper layer: Sn<br>lower layer: Ni | 5<br>31 | soaking<br>at 500° C. for 5 hours | kettchen black<br>urethane resin (water dissolution type)<br>epoxy resin<br>carboxy methylcellulose | 100<br>100<br>20<br>20 | 0.7 |
| Example 32 | Ni | 36 | soaking<br>at 500° C. for 5 hours | channel black<br>urethane resin (water dispersion type)<br>isocyanate compound<br>carboxy methylcellulose | 10<br>150<br>0.2<br>5 | 4 |

TABLE 6

Case of using after-treatment solution containing aqueous phenolic resin

| Example | Plated steel sheet Type of plating | Amounts of plating (g/m2) | Diffusion treatment | After-treatment Type of solution used (g/l) (as solid) | | Dry film thickness (μm) |
|---|---|---|---|---|---|---|
| Example 33 | upper layer: Sn<br>lower layer: Ni | 5<br>31 | soaking<br>at 500° C. for 5 hours | artificial graphite<br>phenolic resin (water dispersion type)<br>carboxy methylcellulose | 350<br>30<br>10 | 0.02 |
| Example 34 | upper layer: Zn | 6 | soaking | vein graphite | 10 | 0.2 |

TABLE 6-continued

Case of using after-treatment solution containing aqueous phenolic resin

| | Plated steel sheet | | | After-treatment | | |
|---|---|---|---|---|---|---|
| Example | Type of plating | Amounts of plating (g/m2) | Diffusion treatment | Type of solution used (g/l) (as solid) | | Dry film thickness (μm) |
| | lower layer: Ni | 36 | at 300° C. for 5 hours | phenolic resin (water dissolution type) carboxy methylcellulose | 1 0.5 | |
| Example 35 | Ni | 50 | soaking at 600° C. for 5 hours | vein graphite phenolic resin (emulsion type) epoxy resin | 120 12 2 | 1 |
| Example 36 | upper layer: Sn lower layer: Ni | 3 31 | — | amorphous graphite phenolic resin (water dispersion type) carboxy methylcellulose | 200 5 2 | 2 |
| Example 37 | Zn-3% Co | 2 | — | acetylene black phenolic resin (water dissolution type) carboxy methylcellulose | 180 18 0.1 | 0.07 |
| Example 38 | Co | 10 | soaking at 500° C. for 5 hours | furnace black phenolic resin (emulsion type) carboxy methylcellulose | 50 200 40 | 10 |
| Comparative Example 1 | upper layer: Sn lower layer: Ni | 5 31 | soaking at 500° C. for 5 hours | — | | — |
| Comparative Example 2 | Ni | 36 | soaking at 500° C. for 5 hours | — | | — |

TABLE 7

Evaluation result of properties

| | Corrosion | Contact resistance (mΩ/cm2) | | Adhesion of cating film formed |
|---|---|---|---|---|
| Example | resistance | initial time | after aging | by after-treatment |
| Example 1 | 10 | ○ | ○ | ○ |
| Example 2 | 10 | ○ | ○ | ⊙ |
| Example 3 | 10 | ○ | ○ | ⊙ |
| Example 4 | 10 | ○ | ○ | ⊙ |
| Example 5 | 10 | ○ | ○ | ⊙ |
| Example 6 | 10 | ○ | ○ | ⊙ |
| Example 7 | 10 | ○ | ○ | ⊙ |
| Example 8 | 10 | ○ | ○ | ⊙ |
| Example 9 | 10 | ○ | ○ | ⊙ |
| Example 10 | 10 | ○ | ○ | ⊙ |
| Example 11 | 10 | ○ | ○ | ⊙ |
| Example 12 | 10 | ○ | ○ | ○ |
| Example 13 | 10 | ○ | ○ | ○ |
| Example 14 | 10 | ○ | ○ | ○ |
| Example 15 | 10 | ○ | ○ | ○ |
| Example 16 | 10 | ○ | ○ | ⊙ |
| Example 17 | 10 | ○ | ○ | ○ |
| Example 18 | 10 | ○ | ○ | ⊙ |
| Example 19 | 10 | ○ | ○ | ⊙ |
| Example 20 | 10 | ○ | ○ | ○ |

TABLE 8

| | | Contact resistance (mΩ/cm2) | | Adhesion of cating film formed |
|---|---|---|---|---|
| Example | Corrosion resistance | initial time | after aging | by after-treatment |
| Example 21 | 10 | ○ | ○ | ⊙ |
| Example 22 | 10 | ○ | ○ | ○ |
| Example 23 | 10 | ○ | ○ | ○ |
| Example 24 | 10 | ○ | ○ | ○ |
| Example 25 | 10 | ○ | ○ | ○ |
| Example 26 | 10 | ○ | ○ | ○ |
| Example 27 | 10 | ○ | ○ | ○ |
| Example 28 | 10 | ○ | ○ | ○ |
| Example 29 | 10 | ○ | ○ | ⊙ |
| Example 30 | 10 | ○ | ○ | ○ |
| Example 31 | 10 | ○ | ○ | ○ |
| Example 32 | 10 | ○ | ○ | ⊙ |
| Example 33 | 10 | ○ | ○ | ⊙ |
| Example 34 | 10 | ○ | ○ | ○ |
| Example 35 | 10 | ○ | ○ | ○ |
| Example 36 | 10 | ○ | ○ | ○ |
| Example 37 | 10 | ○ | ○ | ⊙ |
| Example 38 | 10 | ○ | ○ | ⊙ |
| Comparative example 1 | 5 | ○ | x | — |
| Comparative example 2 | 5 | ○ | x | — |

What is claimed is:

1. A surface-treated steel sheet wherein said surface is provided with a coating film containing carbon black or graphite, carboxy methylcellulose, and an aqueous organic resin, thus said surface-treated steel sheet having a low contact resistance.

2. A surface-treated steel sheet wherein said surface is provided with a coating film containing carbon black or graphite, carboxy methylcellulose, an aqueous organic resin, and a cross linking agent of the said aqueous organic resin, thus the said surface-treated steel sheet having a low, contact resistance.

3. A surface-treated steel sheet according to claim 1, wherein said aqueous organic resin is any one or more selected from the group consisting of acrylic resin, polyester resin urethane resin, and phenolic resin.

4. A surface-treated steel sheet according to claim 1, wherein said steel sheet is plated with Zn, Ni, Sn, Co or any alloy of metals consisting of Zn, Ni, Sn or Co.

5. A surface-treated steel sheet according to claim 4, wherein said plated steel sheet comprises a multilayer plating composed of a lower layer of Ni-plating and an upper layer of Zn-, Sn- or Co-plating.

6. A surface-treated steel sheet, according to claim 4, wherein said plated steel sheet is subjected to diffusion treatment.

7. An electric connection terminal member having a contacting portion with carbon made of the surface-treated steel sheet according to claim 1.

8. A surface-treated steel sheet according to claim 2, wherein said aqueous organic resin is any one or more selected from the group consisting of acrylic resin, polyester resin, urethane resin, and phenolic resin.

9. A surface-treated steel sheet according to claim 2, wherein said steel sheet is plated with Zn, Ni, Sn, Co or any alloy of metals consisting of Zn, Ni, Sn or Co-plating.

10. An electric connection terminal member having a contacting portion with carbon made of the surface-treated steel sheet according to claim 2.

* * * * *

UNITED STATES PATENT AND TRADEMARK OFFICE
CERTIFICATE OF CORRECTION

PATENT NO. : 6,248,456 B1
DATED : June 19, 2001
INVENTOR(S) : Keiji Yamane et al.

Page 1 of 1

It is certified that error appears in the above-identified patent and that said Letters Patent is hereby corrected as shown below:

Title page,
Item [75], after "Yamaguchi" insert -- -ken --.

Signed and Sealed this

Twenty-ninth Day of January, 2002

*Attest:*

*Attesting Officer*

JAMES E. ROGAN
*Director of the United States Patent and Trademark Office*